(12) United States Patent
Nakanishi et al.

(10) Patent No.: US 9,207,495 B2
(45) Date of Patent: *Dec. 8, 2015

(54) LIQUID CRYSTAL DISPLAY DEVICE

(75) Inventors: Youhei Nakanishi, Osaka (JP); Takeshi Noma, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 14/003,470

(22) PCT Filed: Mar. 8, 2012

(86) PCT No.: PCT/JP2012/055960
§ 371 (c)(1),
(2), (4) Date: Sep. 6, 2013

(87) PCT Pub. No.: WO2012/121330
PCT Pub. Date: Sep. 13, 2012

(65) Prior Publication Data
US 2014/0002782 A1 Jan. 2, 2014

(30) Foreign Application Priority Data
Mar. 9, 2011 (JP) ................................. 2011-051531

(51) Int. Cl.
*C09K 19/48* (2006.01)
*G02F 1/1337* (2006.01)
*G02F 1/1333* (2006.01)
*C08F 20/18* (2006.01)
*C08F 20/28* (2006.01)

(52) U.S. Cl.
CPC .......... *G02F 1/133711* (2013.01); *C08F 20/18* (2013.01); *C08F 20/28* (2013.01); *G02F 1/133365* (2013.01); *G02F 1/1337* (2013.01); *G02F 2001/133726* (2013.01)

(58) Field of Classification Search
CPC ............ G02F 1/1337; G02F 1/133711; G02F 1/133365; G02F 2001/133726; C08F 20/18; C08F 20/28; C09K 19/48
USPC ............... 252/299.01, 299.6, 299.63, 299.66; 428/1.1, 1.2; 349/123, 182, 183
See application file for complete search history.

(56) References Cited

U.S. PATENT DOCUMENTS

| | | | |
|---|---|---|---|
| 6,093,344 A * | 7/2000 | Park et al. ................. | 252/299.01 |
| 8,999,465 B2 * | 4/2015 | Nakanishi et al. ............. | 428/1.5 |
| 2003/0143343 A1 | 7/2003 | Kawabata et al. | |
| 2003/0231272 A1 | 12/2003 | Nakamura et al. | |
| 2004/0188653 A1 | 9/2004 | Kataoka et al. | |
| 2005/0012070 A1 | 1/2005 | Inoue et al. | |
| 2005/0109985 A1 | 5/2005 | Kataoka et al. | |
| 2005/0136196 A1 | 6/2005 | Kataoka et al. | |
| 2005/0264737 A1 | 12/2005 | Kataoka et al. | |
| 2006/0054859 A1 | 3/2006 | Shundo et al. | |
| 2006/0066793 A1 | 3/2006 | Ohmuro et al. | |
| 2006/0103804 A1 | 5/2006 | Hirosawa | |
| 2006/0204680 A1 | 9/2006 | Hattori et al. | |
| 2006/0209240 A1 | 9/2006 | Kataoka et al. | |
| 2007/0206129 A1 | 9/2007 | Nakamura et al. | |
| 2009/0056853 A1 | 3/2009 | Pai et al. | |
| 2009/0086139 A1 | 4/2009 | Pai et al. | |
| 2009/0147200 A1 | 6/2009 | Okuyama et al. | |
| 2009/0269515 A1 | 10/2009 | Kataoka | |
| 2010/0045906 A1 | 2/2010 | Tokuda et al. | |
| 2010/0053527 A1 | 3/2010 | Hsieh et al. | |
| 2010/0221456 A1 | 9/2010 | Kataoka et al. | |
| 2012/0050631 A1 | 3/2012 | Ohmuro et al. | |
| 2012/0177847 A1 | 7/2012 | Nakamura et al. | |
| 2012/0219729 A1 | 8/2012 | Kataoka et al. | |
| 2013/0020023 A1 | 1/2013 | Kubota et al. | |
| 2013/0324633 A1 | 12/2013 | Enomoto et al. | |
| 2013/0342791 A1 * | 12/2013 | Mizusaki et al. ............... | 349/86 |
| 2014/0002782 A1 | 1/2014 | Nakanishi et al. | |
| 2014/0139794 A1 | 5/2014 | Ohnishi et al. | |
| 2014/0168586 A1 | 6/2014 | Mizusaki et al. | |
| 2014/0285762 A1 * | 9/2014 | Noma et al. .................. | 349/178 |
| 2014/0333879 A1 | 11/2014 | Noma et al. | |

FOREIGN PATENT DOCUMENTS

| | | |
|---|---|---|
| CN | 101293944 A | 10/2008 |
| JP | 6-230394 | 8/1994 |
| JP | 2000-314887 | 11/2000 |
| JP | 2001-004986 | 1/2001 |

(Continued)

OTHER PUBLICATIONS

International Search Report for PCT/JP2012/055960, mailed Apr. 3, 2012.

(Continued)

*Primary Examiner* — Geraldina Visconti
(74) *Attorney, Agent, or Firm* — Nixon & Vanderhye P.C.

(57) ABSTRACT

The present invention provides a liquid crystal display device in which a display failure is unlikely to occur even in the case of forming no alignment film. The liquid crystal display device according to the present invention includes a pair of substrates having substantially no alignment film; a liquid crystal layer which is sandwiched between the substrates and which contains a liquid crystal material; and a polymer layer which is formed on a surface of at least one of the substrates and which controls the alignment of molecules of a liquid crystal. The polymer layer is one formed by polymerizing at least one monomer contained in the liquid crystal layer. The monomer contains a compound represented by Chemical Formula (1).

6 Claims, 10 Drawing Sheets

(56) References Cited

FOREIGN PATENT DOCUMENTS

| | | |
|---|---|---|
| JP | 2001-004986 A | 1/2001 |
| JP | 2004-004329 | 1/2004 |
| JP | 2004-101782 | 4/2004 |
| JP | 2004-184846 | 7/2004 |
| JP | 2004-294648 | 10/2004 |
| JP | 2004-302061 | 10/2004 |
| JP | 2005-181582 | 7/2005 |
| JP | 2005-338613 | 12/2005 |
| JP | 2006-091545 | 4/2006 |
| JP | 2006-139047 | 6/2006 |
| JP | 2006-145992 | 6/2006 |
| JP | 2007-261952 A | 10/2007 |
| JP | 2010-32860 | 2/2010 |
| JP | 2010-191450 A | 9/2010 |
| TW | 438877 B | 6/2001 |
| WO | WO 2008/065818 | 6/2008 |
| WO | WO 2009/054545 A1 | 4/2009 |
| WO | WO 2010/047260 A1 | 4/2010 |
| WO | 2012/032857 A1 | 3/2012 |
| WO | 2012/050178 A1 | 4/2012 |

OTHER PUBLICATIONS

International Search Report for PCT/JP2012/052261, mailed Feb. 12, 2012.
Office Action mailed Jan. 15, 2015 in U.S. Appl. No. 14/003,976.
International Search Report mailed Jun. 12, 2012 in PCT Application No. PCT/JP2012/055942.
Office Action mailed. Apr. 15, 2015 in U.S. Appl. No. 13/984,830; Noma et al.
Office Action mailed Jun. 18, 2015 in U.S. Appl. No. 13/984,830.
Office Action for U.S. Appl. No. 13/877,974 mailed Sep. 26, 2014; Nakanishi et al.
International Search Report for PCT/JP2011/072308, mailed Nov. 1, 2011.
Official Communication issued in International Patent Application No. PCT/JP2012/072947, mailed Nov. 13, 2012.
Office Action for U.S. Appl. No. 13/984,830 mailed Oct. 8, 2015; NOMA.

\* cited by examiner

LIQUID CRYSTAL DISPLAY DEVICE

This application is the U.S. national phase of International Application No. PCT/JP2012/055960 filed 8 Mar. 2012 which designated the U.S. and claims priority to JP Patent Application No. 2011-051531 filed 9 Mar. 2011, the entire contents of each of which are hereby incorporated by reference.

TECHNICAL FIELD

The present invention relates to liquid crystal display devices. The present invention particularly relates to a liquid crystal display device in which the alignment of liquid crystal molecules is controlled using a polymer layer formed by polymerizing a monomer contained in a liquid crystal composition without forming a conventional alignment film.

BACKGROUND ART

Liquid crystal display devices have a small thickness, low weight, and low power consumption and therefore are widely used as display devices for televisions, personal computers, and PDAs. In particular, in recent years, the liquid crystal display devices have been increasingly upsized as typified by liquid crystal display devices for televisions. A multi-domain vertical alignment (MVA) mode which enables high-yield manufacture in spite of large areas and which provides a wide viewing angle is preferably used for upsizing. The multi-domain vertical alignment mode can provide higher contrast ratio as compared to a conventional TN (twisted nematic) mode because liquid crystal molecules are aligned perpendicularly to a substrate surface when no voltage is applied to a liquid crystal layer.

In the MVA mode, the tilt direction of liquid crystal molecules is not controlled by an alignment film but is determined by the influence of protrusions (ribs) made of an insulating material. Thus, the alignment film need not be subjected to an alignment treatment step and static electricity or dust due to rubbing or the like is not caused; hence, a cleaning step or the like subsequent to alignment treatment is unnecessary. Furthermore, the variation in pretilt of the liquid crystal molecules is small, which is effective for the simplification of a process, an increase in yield, and cost reduction.

In the MVA mode, although alignment treatment is not necessary, a base film corresponding to the alignment film needs to be formed. The base film is preferably eliminated in consideration of the influence of the variation in thickness of the base film or the contamination of dust on the alignment of the liquid crystal molecules and in consideration of the increase in number of manufacturing steps and capital investment for forming the base film.

In recent years, in order to cope with this, the following technique has been attracting attention: a pretilt angle-imparting technique in which a polymer layer is formed in such a way that a liquid crystal composition prepared by mixing a liquid crystal with a polymerizable component (hereinafter simply referred to as "monomer or the like") such as a monomer, an oligomer, or the like is sealed between substrates and the monomer or the like is polymerized in such a state that molecules of the liquid crystal are tilted by applying a voltage between the substrates (refer to, for example, Patent Literatures 1 to 8). The liquid crystal has a predetermined pretilt angle under the influence of the polymer layer even after the applied voltage is removed. Therefore, the tilt direction of the liquid crystal molecules is maintained even though there is no alignment film. Incidentally, the monomer or the like is polymerized by heating or light (for example, ultraviolet ray) irradiation.

CITATION LIST

Patent Literature

PTL 1: Japanese Unexamined Patent Application Publication No. 2004-184846
PTL 2: Japanese Unexamined Patent Application Publication No. 2004-4329
PTL 3: Japanese Unexamined Patent Application Publication No. 2004-294648
PTL 4: Japanese Unexamined Patent Application Publication No. 2004-302061
PTL 5: Japanese Unexamined Patent Application Publication No. 2005-181582
PTL 6: Japanese Unexamined Patent Application Publication No. 2005-338613
PTL 7: Japanese Unexamined Patent Application Publication No. 2006-91545
PTL 8: Japanese Unexamined Patent Application Publication No. 2006-145992

SUMMARY OF INVENTION

Technical Problem

However, investigations conducted by the inventors have revealed that even though a polymer layer is formed in such a way that a liquid crystal composition containing a liquid crystal material, a monomer, a polymerization initiator, and the like is injected between a pair of substrates and a polymerization reaction is caused under predetermined conditions, good display is not achieved depending on materials used or production conditions in some cases. In particular, hysteresis is induced in V-T characteristics to cause defects in alignment and luminous dots or luminous lines appear in black display in some cases.

FIGS. 22 and 23 are schematic views each illustrating a black screen of a liquid crystal display device formed by a conventional polymer layer-forming technique. FIG. 22 illustrates an example (first conventional example) using lauryl acrylate, which is described in Patent Literature 4 and is represented by Chemical Formula (7) below, as a monomer material.

[Chem. 1]

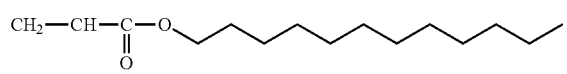

(7)

FIG. 23 illustrates an example (second conventional example) using monomers represented by Chemical Formulae (6-1) to (6-4) below as monomer materials.

[Chem. 2]

-continued

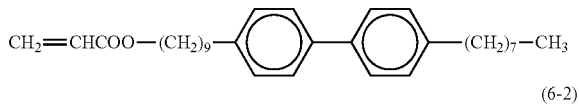
(6-1)

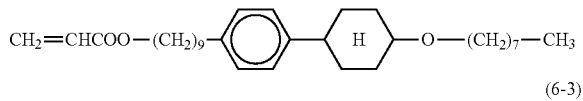
(6-2)

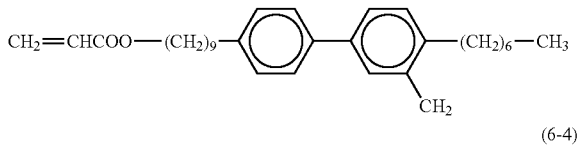
(6-3)

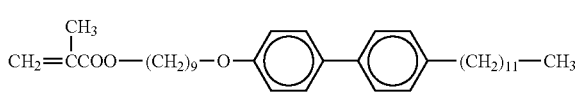
(6-4)

The monomers are shown in FIG. 10 of Patent Literature 4.

The black screens shown in FIGS. 22 and 23 are those in which a liquid crystal display panel having no polarizer is observed with a polarizing microscope in which polarization axes are set so as to intersect at 90°. As illustrated in FIGS. 22 and 23, in the conventional examples, a plurality of luminous dots and luminous lines are present in each black screen. This shows the occurrence of a display failure. In particular, the first conventional example has a large number of luminous dots and luminous lines.

The inventors have investigated various methods for achieving good display without forming any alignment film and have focused on the type of a monomer contained in a liquid crystal composition. The inventors have found the use of a compound represented by Chemical Formula (5) below.

[Chem. 3]

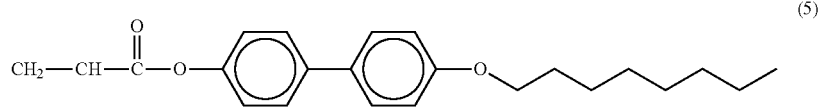
(5)

In the case of using this compound as a monomer, luminous lines can be almost completely eliminated during The compound represented by Chemical Formula (5) has a structure in which a biphenyl group is directly bonded to a functional group. Two benzene rings are bonded to each other at the 1-position and the 1'-position and have a linear structure. Since the functional group is directly bonded to the benzene rings, a structure in which no bent portion is present between the functional group located at an end and biphenyl, that is, a stable linear structure is obtained. When the number of carbon atoms in an alkyl group bonded to a polymerizable functional group is excessively large, the degree of freedom of a structure between a benzene ring and the functional group is high and therefore alignment stability becomes low. However, according to the compound represented by Chemical Formula (5), such a degree of freedom is low and alignment stability increases.

However, the inventors have further investigated and have revealed that in the case of preparing a polymer layer using the compound represented by Chemical Formula (5), the reduction in voltage holding ratio of a liquid crystal display device is caused in some cases.

The present invention has been made in view of the above circumstances and has an object to provide a liquid crystal display device in which high alignment stability can be achieved and voltage holding ratio can be maintained even in the case of forming no alignment film.

Solution to Problem

As a result of intensive investigations, the inventors have found that high alignment stability is achieved and the reduction of voltage holding ratio can be suppressed in such a way that a monomer containing a biphenyl group is a basic constituent and the number of carbon atoms in an alkyl group bonded to the biphenyl group and a functional group is limited to a range between 2 and 4. In this way, the inventors have appreciated that the above object can be achieved well, thereby attaining the present invention.

That is, the present invention provides a liquid crystal display device including a pair of substrates having substantially no alignment film, a liquid crystal layer which is sandwiched between the substrates and which contains a liquid crystal material, and a polymer layer which is formed on a surface of at least one of the substrates and which controls the alignment of molecules of a liquid crystal. The polymer layer is one formed by polymerizing at least one monomer contained in the liquid crystal layer. The monomer contains a compound represented by Chemical Formula (1) below.

[Chem. 4]

-continued

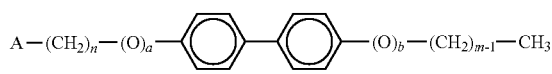
(1)

(In the formula, A represents an acrylate group, a methacrylate group, an ethacrylate group, a vinyl group, or an allyl group; a is 0 or 1; b is 0 or 1; m is a natural number of 4 to 12; and n is a natural number of 2 to 4.)

The liquid crystal display device according to the present invention is described below in detail.

The substrates, which are included in the liquid crystal display device according to the present invention, are those for holding the liquid crystal layer and are prepared in such a way that, for example, insulating base plates made of glass, resin, or less are used as bases and wiring lines, electrodes, color filters, and the like are provided on the insulating base plates.

In the present invention, both of the substrates have substantially no alignment film. The term "alignment film" refers to a single-layer or multilayer film which is made from polyimide, polyamic acid, polymaleimide, polyamide, polysiloxane, polyphosphazene, silsesquioxane, or a copolymer thereof or is formed by the oblique vapor deposition of silicon oxide, which is formed on the outermost surface of one of the substrates, and which can control the alignment of the liquid crystal. In a common liquid crystal display device, an alignment film is formed in such a way that an alignment film material is directly applied (the application of, for example, a material containing at least one of polyimide, polyamic acid, polymaleimide, polyamide, polysiloxane, polyphosphazene, silsesquioxane, and a copolymer thereof) to or vapor-deposited (the oblique vapor deposition of, for example, silicon oxide (SiO)) on a site forming a display region. The display region is a region forming an image perceived by an observer and does not include, for example, a peripheral region such as a terminal section. The alignment film is not limited to one subjected to alignment treatment and may be one formed by the application of a so-called common alignment film material. One subjected to alignment treatment is, for example, one subjected to rubbing and one subjected to alignment treatment. Even if being not subjected to alignment treatment, for example, a vertical alignment film can align liquid crystal molecules in a direction perpendicular to a surface of the film or a horizontal alignment film can align liquid crystal molecules in a direction parallel to a surface of the film. In the case of providing such an alignment control structure as used in an MVA mode, a PVA mode, a CPA mode, or the like described below, the tilt of liquid crystal molecules can be controlled without performing alignment treatment. In this specification, the expression "having substantially no alignment film" means that such an existing alignment film is not formed.

FIG. 24 is a flowchart illustrating an example of a process for manufacturing a common liquid crystal display device. On the other hand, FIG. 25 is a flowchart illustrating an example of a process for manufacturing the liquid crystal display device according to the present invention. As illustrated in FIG. 24, hitherto, after substrates are cleaned, an alignment film material is applied thereto and is calcined and a bonding step such as seal printing is then performed. However, in the present invention, as illustrated in FIG. 25, after substrates are cleaned, seal printing is performed without performing a step of forming an alignment film. Hitherto, after the substrates are spliced together, a step of attaching a polarizer is performed. In the present invention, after the substrates are spliced together, a polymerization step of forming a polymer layer by, for example, exposure or less is performed. An example of a seal printing method is such a way that material is applied, is cured by ultraviolet light exposure, and/or is cured by heat. Examples of a method for filing a liquid crystal include a dripping method and a vacuum injection method. In this case, after a seal is calcined, the vacuum injection of the liquid crystal is performed. In addition, examples of a method for maintaining the thickness of a liquid crystal layer include a method using a spacer, a method for patterning a columnar photospacer, and a method for spraying a spherical spacer.

The polymer layer, which controls the alignment of the liquid crystal molecules, is formed on at least one of the substrates. The polymer layer is one formed by polymerizing at least one monomer contained in the liquid crystal layer. The monomer contains the compound represented by Chemical Formula (1). The number n of carbon atoms in an alkyl group bonded to a functional group represented by A is set to a range between 2 and 4, whereby high alignment stability can be achieved and the reduction of voltage holding ratio can be suppressed. Furthermore, the number m of carbon atoms in a terminal alkyl group is set to a range between 4 and 12, whereby the solubility to the liquid crystal material can be increased.

In the present invention, the polymer layer may further contain a compound other than the compound represented by Chemical Formula (1) as a monomer. The monomer is preferably a bifunctional monomer. The molar ratio of the bifunctional monomer to the compound represented by Chemical Formula (1) is 0.1 or less. The liquid crystal layer may contain a polymerization initiator.

In the present invention, the polymer layer is formed using a monomer in which an alkyl group, alkoxy group, or a functional group is bonded to the 4-4' position of a biphenyl group. In addition, a linear alkyl group is bonded between the functional group and the biphenyl group. Therefore, the liquid crystal molecules can be aligned in a direction perpendicular to a surface of the polymer layer with strong anchoring force.

In the present invention, the polymer layer is formed using a monomer containing a biphenyl group. Therefore, the liquid crystal molecules can be aligned with strong anchoring force such that the major axis of each liquid crystal molecule is aligned in a direction along a side chain of a polymer.

Furthermore, in the present invention, the polymer layer is formed using a monomer having a linear structure extending from a biphenyl group to an end of an alkyl chain. Therefore, the liquid crystal molecules can be aligned with stable anchoring force.

The compound represented by Chemical Formula (1) may contain or need not contain an —O— group. Allowing the —O— group to be added enables easy manufacture.

The polymer layer, which is formed using the monomer represented by Chemical Formula (1) as described above, is placed on a surface in contact with the liquid crystal layer. Therefore, good display quality with few luminous dots or luminous lines is achieved and a liquid crystal display device which is unlikely to be reduced in voltage holding ratio can be obtained.

The configuration of the liquid crystal display device according to the present invention is not particularly limited by other components as long as such components are essentially formed.

As a preferred mode of the liquid crystal display device according to the present invention, the following mode is cited: a mode (MVA mode) in which the substrates each include an electrode, one of the substrates has a wall-shaped dielectric protrusion located on the liquid crystal layer side of the electrode, and the electrode included in the other substrate has a slit. Since the dielectric protrusion and the slit are present, the polymer layer can be formed such that the alignment of the liquid crystal can be uniformly controlled.

As a preferred mode of the liquid crystal display device according to the present invention, the following mode is cited: a mode (PVA mode) in which the substrates each include an electrode and the electrode has a slit. Since the slit is present, the polymer layer can be formed such that the alignment of the liquid crystal can be uniformly controlled.

As a preferred mode of the liquid crystal display device according to the present invention, the following mode is cited: a mode (CPA mode) in which the substrates each include an electrode and one of the substrates has a columnar dielectric protrusion located on the liquid crystal layer side of the electrode. Since the dielectric protrusion is present, the polymer layer can be formed such that the alignment of the liquid crystal can be uniformly controlled.

Advantageous Effects of Invention

In a liquid crystal display device according to the present invention, even in the case of forming no alignment film, a polymer layer is formed so as to exert strong vertical anchoring force on liquid crystal molecules. Therefore, the occurrence of luminous dots or luminous lines can be suppressed during black display and the voltage holding ratio can be maintained.

DESCRIPTION OF EMBODIMENTS

The present invention will now be described in detail with reference to embodiments. The present invention is not limited only to the embodiments.

First Embodiment

Figure 1:
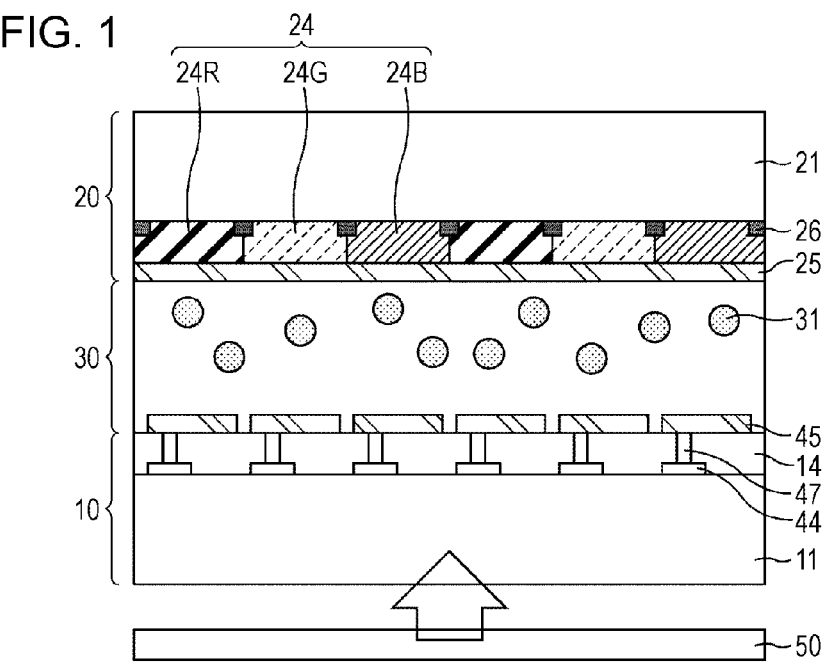
FIG. 1 is a schematic sectional view of a liquid crystal display device according to a first embodiment and illustrates the liquid crystal display device prior to a monomer polymerization step.
Figure 2:
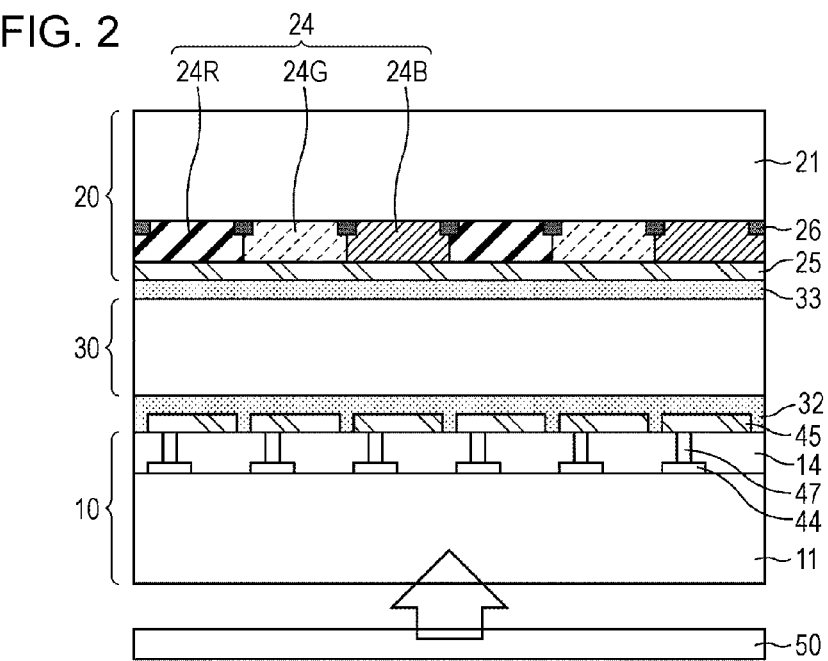
FIG. 2 is a schematic sectional view of the liquid crystal display device according to the first embodiment and illustrates the liquid crystal display device subsequent to the monomer polymerization step.

FIGS. 1 and 2 are schematic sectional views of a liquid crystal display device according to a first embodiment. FIG. 1 illustrates the liquid crystal display device prior to a monomer polymerization step. FIG. 2 illustrates the liquid crystal display device subsequent to the monomer polymerization step. As illustrated in FIGS. 1 and 2, the liquid crystal display device according to the first embodiment includes a liquid crystal display panel that includes an array substrate 10, a counter substrate 20, and a liquid crystal layer 30 sandwiched between a pair of substrates including the array substrate 10 and the counter substrate 20. Furthermore, the liquid crystal display device includes a backlight 50 placed behind the liquid crystal display panel. The liquid crystal display device according to the first embodiment is a transmission-type liquid crystal display device which performs display using light emitted from the backlight 50. As a modification of the liquid crystal display device according to the first embodiment, the following device is cited: a reflection-type liquid crystal display device which does not include the backlight 50 and in which outside light is used as display light. This method can sufficiently perform liquid crystal display.

The array substrate 10 includes an insulating transparent base plate 11 made of glass or the like and conductive members such as wiring lines, pixel electrodes 45, thin film transistors (TFTs) 44, and contact portions 47 connecting the TFTs 44 to the pixel electrodes 45, formed on the insulating transparent base plate 11. The liquid crystal display device according to the first embodiment has substantially no alignment film on the pixel electrodes 45. An insulating film 14 is formed between the TFTs 44 and the pixel electrodes 45.

The counter substrate 20 includes an insulating transparent base plate 21 made of glass or the like, color filters 24, a black matrix 26, and a common electrode 25. The liquid crystal display device according to the first embodiment has substantially no alignment film on the common electrode 25. FIGS. 1 and 2 illustrate one using three-color filters of red 24R, green 24G, and blue 24B. However, the kind, number, and arrangement order of colors are not particularly limited as long as at least these three colors are used.

The liquid crystal layer 30 is filled with a liquid crystal material. The kind of the liquid crystal material is not particularly limited. The liquid crystal material may have negative dielectric anisotropy or positive dielectric anisotropy and may be appropriately selected depending on the display mode of a liquid crystal. In the first embodiment, the following layer is obtained as described below: a polymer layer having properties excellent in aligning the pretilt of molecules of a liquid crystal in a direction perpendicular to a substrate surface. Therefore, a good vertical alignment (VA) mode can be achieved using, for example, a liquid crystal material having negative dielectric anisotropy.

As illustrated in FIG. 1, at least one monomer 31 is present in the liquid crystal layer 30 before the polymerization step. The polymerization step allows the monomer 31 to initiate polymerization, whereby polymer layers 32 and 33 are formed over the pixel electrodes 45 and the common electrode 25, respectively, as illustrated in FIG. 2.

In particular, the polymer layers 32 and 33 can be formed in such a way that a liquid crystal composition containing the monomer 31 and a liquid crystal material is injected between the array substrate 10 and the counter substrate 20, the liquid crystal layer 30 is thereby formed, and the liquid crystal layer 30 is photopolymerized by irradiating the liquid crystal layer 30 with a certain amount of light. The polymerization of the monomer 31 is initiated under the influence of active species generated by irradiating, for example, a polymerization initiator with light. FIG. 2 illustrates that the polymer layers 32 and 33 are formed on a single surface. Actually, a plurality of polymer layers may be formed in a dotted pattern and may have a variation in thickness.

At least one of monomers used in the first embodiment is a compound represented by Chemical Formula (1) below.

[Chem. 5]

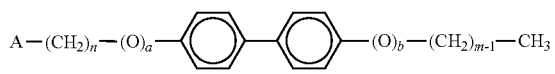

(1)

(In the formula, A represents an acrylate group, a methacrylate group, an ethacrylate group, a vinyl group, or an allyl group; a is 0 or 1; b is 0 or 1; m is a natural number of 4 to 12; and n is a natural number of 2 to 4.)

The compound represented by Chemical Formula (1) contains a biphenyl group. Therefore, the following layer can be formed: a polymer layer that aligns the liquid crystal molecules adjacent thereto with strong anchoring force such that the major axis of each liquid crystal molecule is aligned in a direction along a side chain of a polymer.

In addition, the compound represented by Chemical Formula (1) contains an alkyl group or alkoxy group bonded to the 4-4' position of the biphenyl group. A linear alkyl group containing two to four carbon atoms is bonded between a functional group A and the biphenyl group. Therefore, the following layer can be formed with the degree of freedom of a structure between a benzene ring and the functional group suppressed: a polymer layer that aligns the liquid crystal molecules with strong anchoring force in a direction perpendicular to a substrate.

Furthermore, the compound represented by Chemical Formula (1) has a linear structure extending from a biphenyl group to an end of an alkyl chain. Therefore, a polymer layer that aligns the liquid crystal molecules with stable anchoring force can be formed.

In the first embodiment, another monomer may be used as long as the monomer represented by Chemical Formula (1) is used. The other monomer is preferably a bifunctional monomer. The molar ratio of the other monomer to the compound represented by Chemical Formula (1) is preferably 0.1 or less.

Examples of the bifunctional monomer include a compound represented by Chemical Formula (2) below and a compound represented by Chemical Formula (3) below.

[Chem. 6]

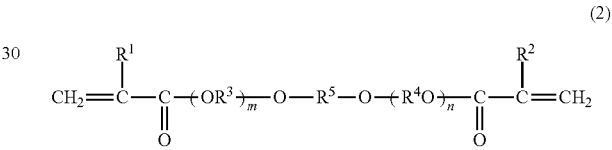

(2)

($R^1$ represents a hydrogen atom or an alkyl group containing one or two carbon atoms; $R^2$ represents a hydrogen atom or an alkyl group containing one or two carbon atoms; $R^3$ represents the same or different alkylene groups containing two to four carbon atoms; $R^4$ represents the same or different alkylene groups containing two to four carbon atoms; $R^5$ represents a linear or branched aliphatic hydrocarbon group, an aromatic hydrocarbon group, or an alicyclic hydrocarbon group; m represents an integer of 0 to 4; and n represents an integer of 0 to 4.)

[Chem. 7]

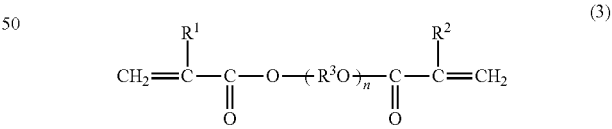

(3)

($R^1$ represent a hydrogen atom or an alkyl group containing one or two carbon atoms; $R^2$ represents a hydrogen atom or an alkyl group containing one or two carbon atoms; $R^3$ represents the same or different alkylene groups containing one to three carbon atoms; and n represents an integer of 0 to 12.)

In the first embodiment, the polymer layers may be formed in such a way that a voltage higher than a threshold value is not applied to the liquid crystal layer 30. For example, when the monomer polymerization step is performed, the liquid crystal layer 30 is irradiated with light in such a state that a voltage higher than the threshold value is applied to the liquid crystal layer 30, whereby a polymer is formed so as to follow the liquid crystal molecules that are aligned in such a state that a voltage higher than the threshold value is applied thereto.

In the case of forming, for example, an alignment control structure capable of tilting the liquid crystal molecules to a substrate surface in a certain direction during the application of a voltage higher than the threshold value, a polymer layer is formed so as to follow the liquid crystal molecules tilted in a certain direction. Cases are separately described below.

Second Embodiment

Examples of an alignment control structure include a wall-shaped dielectric protrusion which is placed on an electrode and which extends toward a liquid crystal layer and a slit placed in an electrode. The dielectric protrusion and the slit can be formed by a photolithographic process. An example of a material for the dielectric protrusion is a photosensitive acrylic resin. Such a wall-shaped (linear in plan view) dielectric protrusion is also referred to as a rib. A mode in which the alignment of liquid crystal molecules is controlled using a rib or a slit as an alignment control structure is referred to as an MVA (multi-domain vertical alignment) mode.

Figure 3:
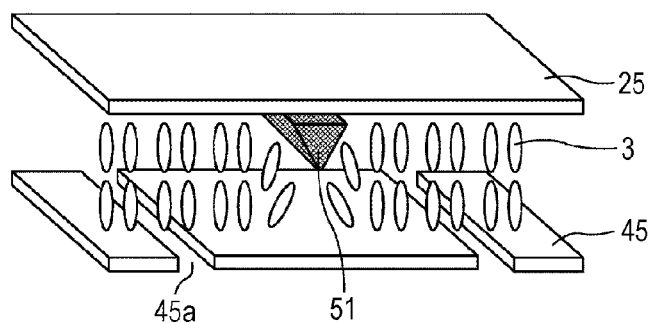
FIG. 3 is a schematic perspective view of a liquid crystal display device according to a second embodiment and illustrates the liquid crystal display device supplied with no voltage.
Figure 4:
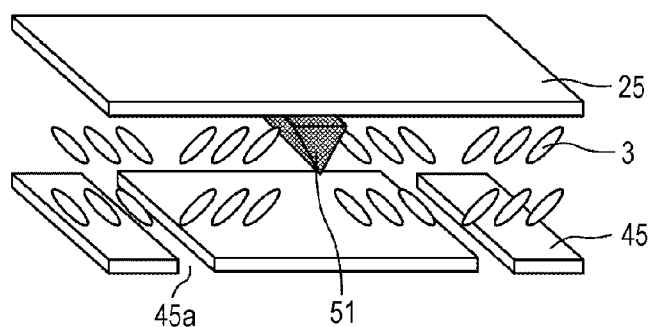
FIG. 4 is a schematic perspective view of the liquid crystal display device according to the second embodiment and illustrates the liquid crystal display device supplied with voltage.

FIGS. 3 and 4 are schematic perspective views of a liquid crystal display device, according to a second embodiment, using the MVA mode. FIG. 3 illustrates the liquid crystal display device supplied with no voltage. FIG. 4 illustrates the liquid crystal display device supplied with voltage. In the MVA mode, ribs 51 made of a dielectric are arranged on an electrode included in one of substrates and slits 45a are arranged in electrodes 45 included in the other substrate. As illustrated in FIG. 3, when liquid crystal molecules 3 are supplied with no voltage, most of the liquid crystal molecules 3 are vertically aligned except some of the liquid crystal molecules 3 that are adjacent to the ribs 51. However, when being supplied with voltage, they are tilted to the rib 51 and the slits 45a in an oblique direction as illustrated in FIG. 4.

Figure 5:
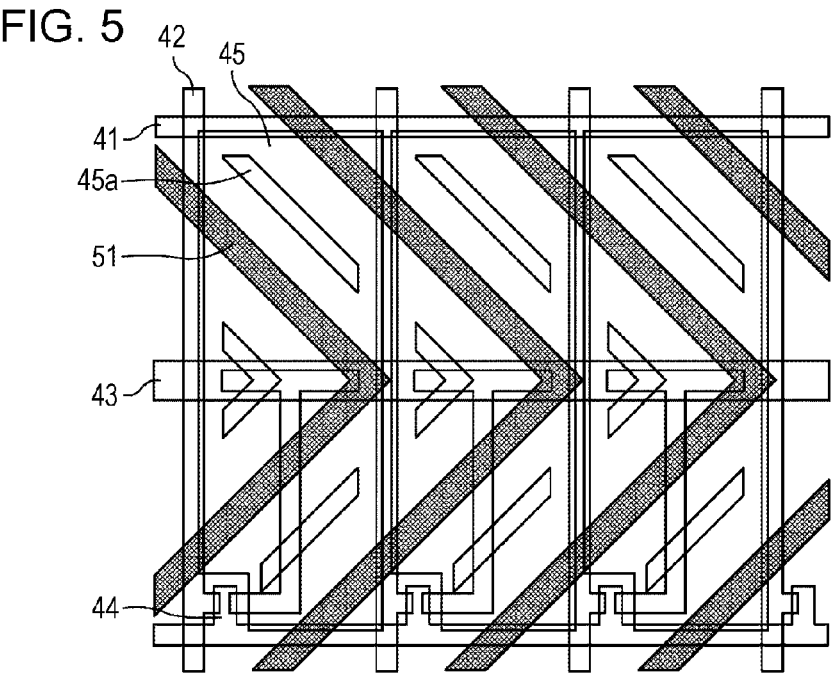
FIG. 5 is a schematic plan view of the liquid crystal display device according to the second embodiment.

FIG. 5 is a schematic plan view of the liquid crystal display device according to the second embodiment. As illustrated in FIG. 5, the ribs 51 and the slits 45a are linear in plan view and are arranged at certain intervals. Regions having different intervals may be partly present. However, substantially all the alignment control structures 45a and 51 preferably have constant intervals. This allows good display with little display unevenness to be achieved.

The ribs 51 are arranged on a common electrode 25 and are formed regardless of the size or shape of pixels. It is preferred that the ribs 51 partly include a bent portion and are partly dogleg-shaped (V-shaped) in plan view. In this case, the ribs 51 have a zigzag shape in terms of the entire substrate. This allows, in each pixel, the liquid crystal molecules 3 adjacent to the ribs 51 to be aligned in four different directions with good balance.

As illustrated in FIG. 5, in the liquid crystal display device according to the second embodiment, an array substrate includes the pixel electrodes 45. The pixel electrodes 45 each have substantially a rectangular shape and are arranged in a matrix pattern to form a display screen. The term "substantially rectangular" means that a rectangular shape may partly include a protrusion or a notch as illustrated in FIG. 5.

The array substrate includes a plurality of gate signal lines 41 extending in parallel to each other, a plurality of source signal lines 42 extending in parallel to each other, and a plurality of auxiliary capacitor (CS) wiring lines 43 extending in parallel to each other with each insulating film interposed therebetween. The gate signal lines 41 and the auxiliary capacitor (CS) wiring lines 43 extend in parallel to each other and intersect with the source signal lines 42. In addition, each of the gate signal lines 41 and the source signal lines 42 is connected to a corresponding one of electrodes included in thin film transistors (TFTs) 44. The TFTs 44 are three-terminal field effect transistors and each include a semiconductor layer and three electrodes: a gate electrode, a source electrode, and a drain electrode. The TFTs 44 serve as switching elements controlling the operation of the pixels. Incidentally, in the first embodiment, multiplex driving may be performed in such a way that each pixel electrode 45 is divided into a plurality of sub-pixel electrodes, each sub-pixel electrode is connected to a TFT, and two of the sub-pixel electrodes are controlled with one of the gate lines.

On the other hand, a counter substrate includes a BM (black matrix) with light-blocking ability and color filters transmit light with specific wavelengths. The BM extends between the color filters to form a grid as a whole. The BM is positioned so as to overlap the wiring lines and TFTs of the array substrate. Each of the color filters is positioned so as to overlap a corresponding one of the pixel electrodes of the array substrate.

Figure 6:
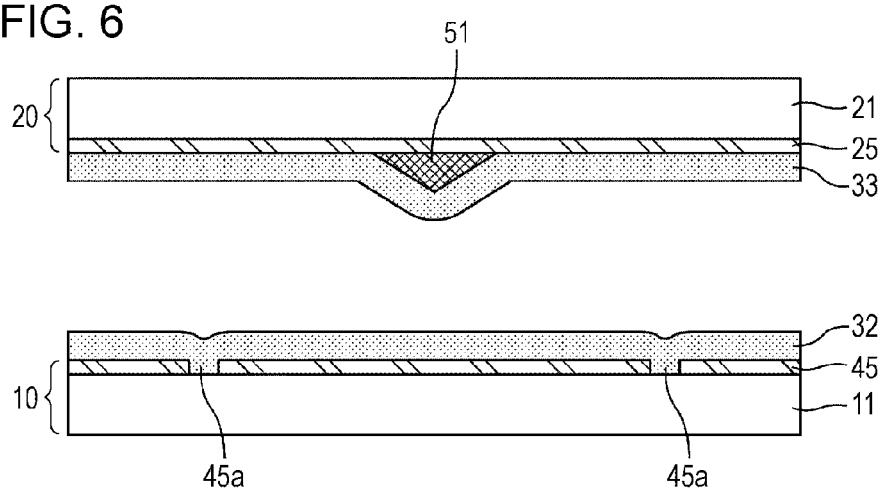
FIG. 6 is a schematic sectional view of the liquid crystal display device, according to the second embodiment, subsequent to a monomer polymerization step.

FIG. 6 is a schematic sectional view of the liquid crystal display device, according to the second embodiment, subsequent to a step of polymerizing a monomer. In FIG. 6, the wiring lines, the electrodes, the color filters, or the like are not illustrated. In the second embodiment, as illustrated in FIG. 6, the electrodes 25 and 45 are formed on a pair of glass base plates 11 and 21, respectively. Moreover, polymer layers are formed over substrates 10 and 20, respectively, including the electrodes 25 and 45, sites exposed from the slits in the electrodes 45, the rib 51, and the like and form interfaces with the liquid crystal layer. Since the polymer layers 32 and 33 used in the first embodiment have strong vertical anchoring force, good black display is achieved and display defects such as luminous dots and luminous lines are unlikely to be caused.

Third Embodiment

In the second embodiment, the mode using both the ribs and the slits is described. However, polymer layers can be similarly formed along the alignment of liquid crystal molecules in such a way that, for example, slits are formed in electrodes of a pair of substrates. The following mode is also referred to as a PVA (patterned vertical alignment) mode: a mode in which the alignment of liquid crystal molecules is controlled using the slits, which are placed in the electrodes of the substrates in this way.

Figure 7:
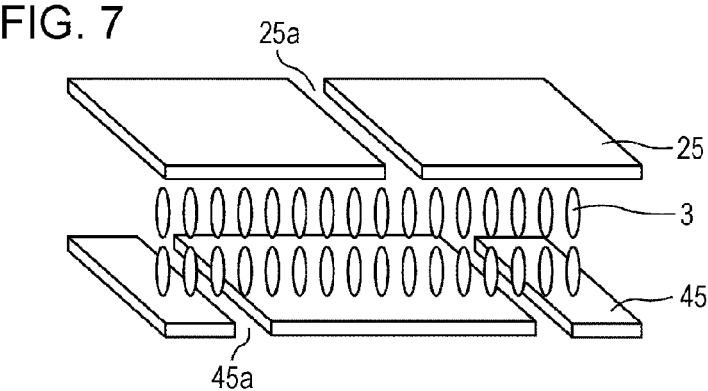
FIG. 7 is a schematic perspective view of a liquid crystal display device according to a third embodiment and illustrates the liquid crystal display device supplied with no voltage.
Figure 8:
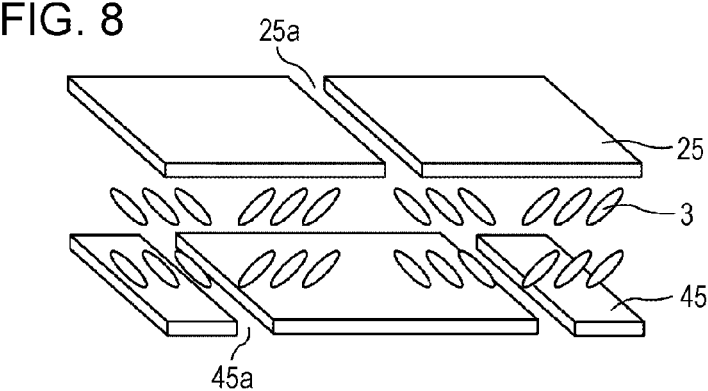
FIG. 8 is a schematic perspective view of the liquid crystal display device according to the third embodiment and illustrates the liquid crystal display device supplied with voltage.

FIGS. 7 and 8 are schematic perspective views of a liquid crystal display device according to a third embodiment. FIG. 7 illustrates the liquid crystal display device supplied with no voltage. FIG. 8 illustrates the liquid crystal display device supplied with voltage. In the PVA mode, slits are formed in electrodes 25 and 45 of one of substrates. When liquid crystal molecules 3 are supplied with no voltage, most of the liquid crystal molecules 3 are vertically aligned as illustrated in FIG. 7. However, when being supplied with voltage, they are tilted to slits 25a and 45a in an oblique direction as illustrated in FIG. 8.

Figure 9:
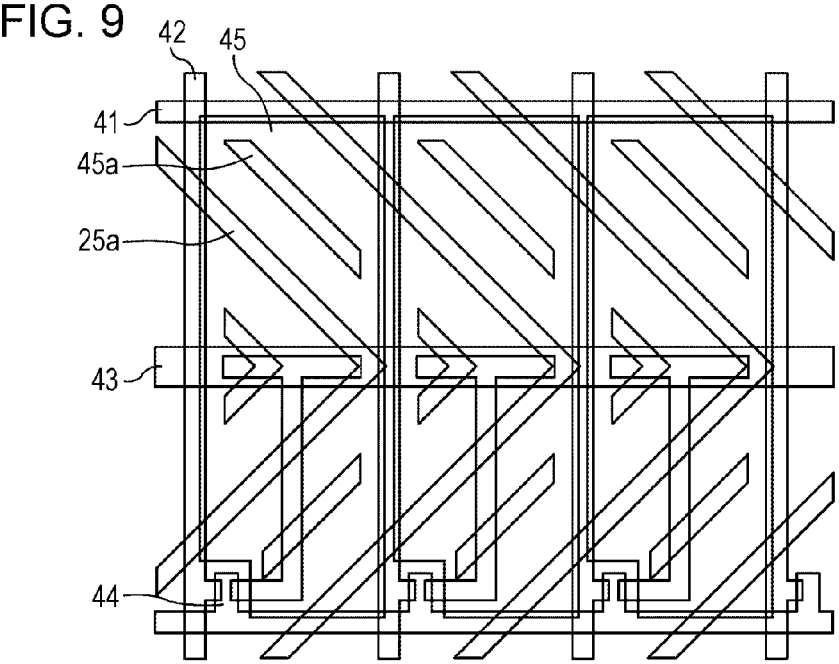
FIG. 9 is a schematic plan view of the liquid crystal display device according to the third embodiment.

FIG. 9 is a schematic plan view of the liquid crystal display device according to the third embodiment. As illustrated in FIG. 9, the slits 25a and 45a are linear in plan view and are arranged at certain intervals. Regions having different intervals may be partly present. However, substantially all the slits 25a and 45a preferably have constant intervals. This allows good display with little display unevenness to be achieved.

The slits 25a are arranged in a common electrode 25 and may be formed regardless of the size or shape of pixels. In this case, it is preferred that the slits 25a partly include a bent portion and are partly dogleg-shaped (V-shaped) in plan view. This allows the liquid crystal molecules 3 adjacent thereto to be aligned in four different directions with good balance.

Figure 10:
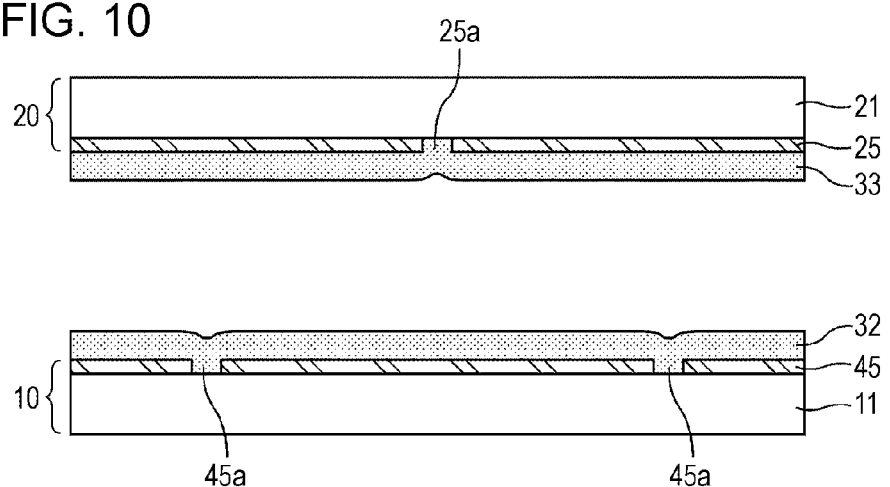
FIG. 10 is a schematic sectional view of the liquid crystal display device, according to the third embodiment, subsequent to a monomer polymerization step.

FIG. 10 is a schematic sectional view of the liquid crystal display device, according to the third embodiment, subsequent to a step of polymerizing a monomer. In FIG. 10, wiring lines, electrodes, color filters, or the like are not illustrated. In the third embodiment, as illustrated in FIG. 10, the electrodes 25 and 45 are formed on a pair of glass base plates 11 and 21, respectively. Moreover, polymer layers 32 and 33 are formed over the substrates 10 and 20, respectively, including the electrodes 25 and 45, sites exposed from the slits 25a and 45a in the electrodes, and the like and form interfaces with liquid crystal layers. Since the polymer layers 32 and 33 used in the first embodiment have strong vertical anchoring force, good black display is achieved and display defects such as luminous dots and luminous lines are unlikely to be caused.

Fourth Embodiment

In the second embodiment, an example using wall-shaped (linear in plan view) ribs placed on the common electrode as the dielectric protrusion is described. However, a columnar (dot-shaped in plan view) structure may be formed on the common electrode as the dielectric protrusion. Such a columnar (dot-shaped in plan view) dielectric protrusion is also referred to as a rivet. In addition, a mode in which the alignment of liquid crystal molecules is controlled using a rivet as an alignment control structure is referred to as a CPA (continuous pinwheel alignment) mode. In the CPA mode, any slit need not be provided in a pixel electrode and a hole may be provided in a common electrode and may be used instead of a rivet.

Figure 11:
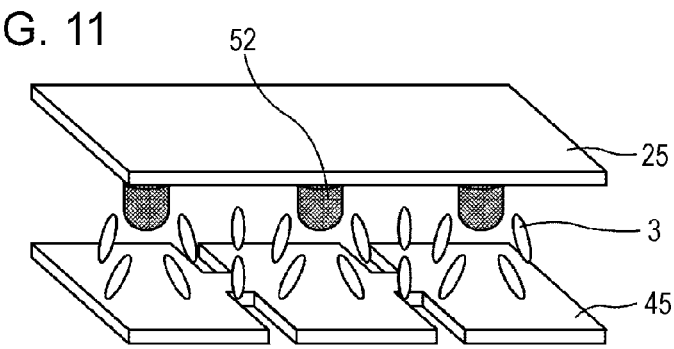
FIG. 11 is a schematic perspective view of an example of a liquid crystal display device, according to a fourth embodiment and illustrates the liquid crystal display device supplied with no voltage.
Figure 12:
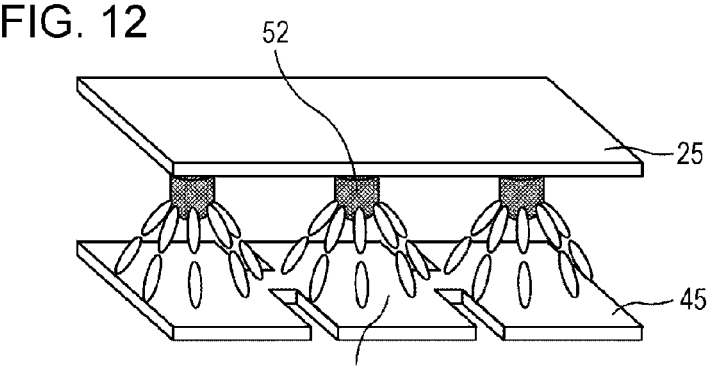
FIG. 12 is a schematic perspective view of an example of the liquid crystal display device according to the fourth embodiment and illustrates the liquid crystal display device supplied with voltage.

FIGS. 11 and 12 are schematic perspective views of an example of a liquid crystal display device according to a fourth embodiment, using the CPA mode. FIG. 11 illustrates the liquid crystal display device supplied with no voltage. FIG. 12 illustrates the liquid crystal display device supplied with voltage. In the CPA mode, rivets 52 made of a dielectric are formed on an electrode 25 of one of substrates and slits are formed in electrodes 45 of the other substrate in accordance with the arrangement of the rivets. When liquid crystal molecules 3 are supplied with no voltage, most of the liquid crystal molecules 3 are vertically aligned as illustrated in FIG. 11 except some of the liquid crystal molecules 3 that are adjacent to the rivets 52. However, when being supplied with voltage, they are aligned with the rivets 52 in a radial pattern as illustrated in FIG. 12.

Figure 13:
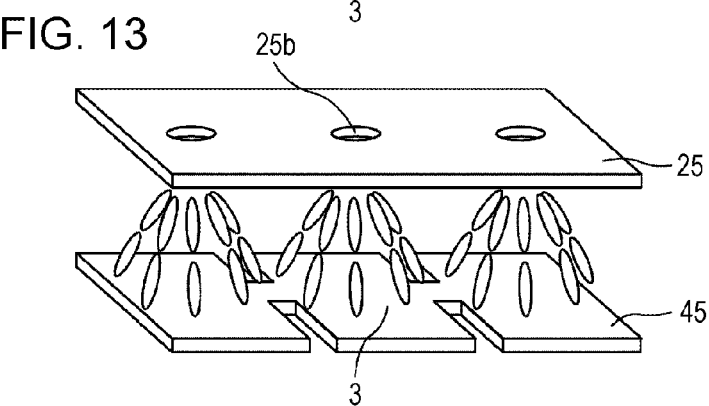
FIG. 13 is a schematic perspective view of another example of the liquid crystal display device according to the fourth embodiment.

FIG. 13 is a schematic perspective view of another example of the liquid crystal display device according to the fourth embodiment and illustrates a configuration that is substantially the same as that illustrated in FIG. 12 except that holes 25b are formed at the positions of the rivets. FIG. 13 illustrates the liquid crystal display device supplied with voltage. Liquid crystal molecules are aligned with the holes 25b in a radial pattern similarly to the case of using the rivets.

Figure 14:
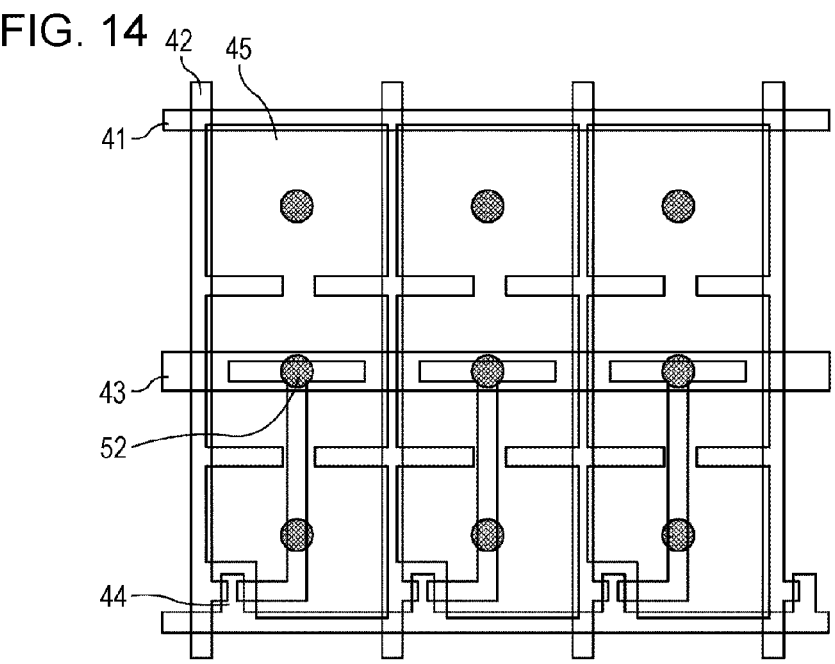
FIG. 14 is a schematic plan view of the liquid crystal display device, according to the fourth embodiment, illustrated in FIGS. 11 and 12.

FIG. 14 is a schematic plan view of the liquid crystal display device, according to the fourth embodiment, illustrated in FIGS. 11 and 12. As illustrated in FIG. 14, the rivets 52 are dot-shaped in plan view and each pixel is provided with three of the rivets 52. Slits are formed in pixel electrodes and each pixel electrode is roughly sectioned into three regions. Each of the rivets 52 is placed at a position overlapping the center of a corresponding one of the three sectioned regions. The intervals between the rivets 52 are preferably constant from the viewpoint of reducing display unevenness and regions having different intervals may be partly present.

Figure 15:
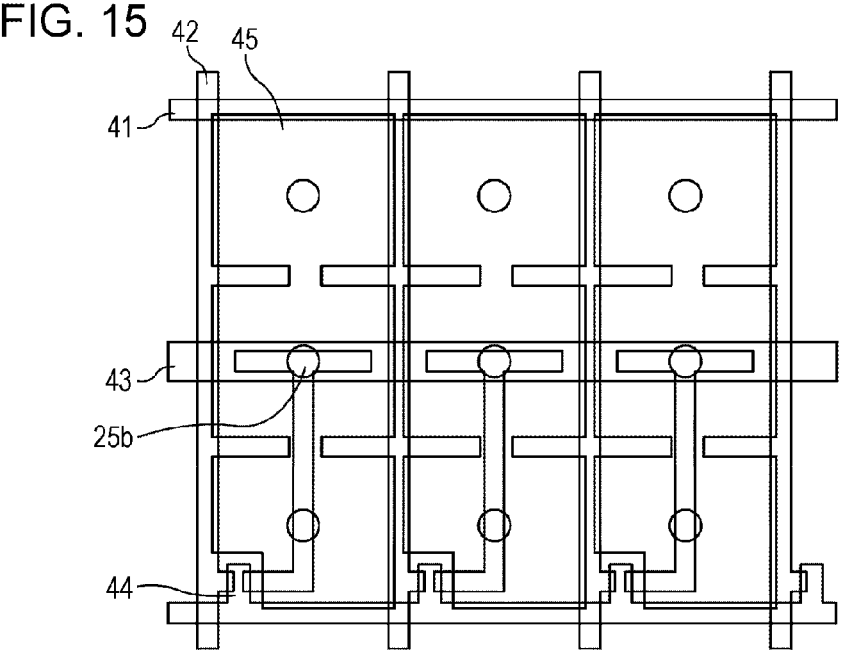
FIG. 15 is a schematic plan view of the liquid crystal display device, according to the fourth embodiment, illustrated in FIG. 13.

FIG. 15 is a schematic plan view of the liquid crystal display device, according to the fourth embodiment, illustrated in FIG. 13 and illustrates a configuration that is substantially the same as that illustrated in FIG. 14 except that holes 25b are formed at the positions of the rivets.

Figure 16:
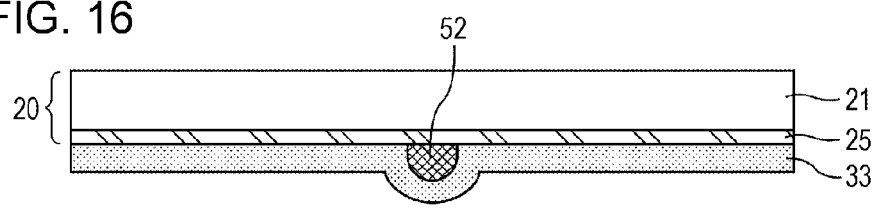
FIG. 16 is a schematic sectional view of the liquid crystal display device, according to the fourth embodiment, illustrated in FIGS. 11 and 12, the liquid crystal display device being subsequent to a monomer polymerization step.
Figure 16:
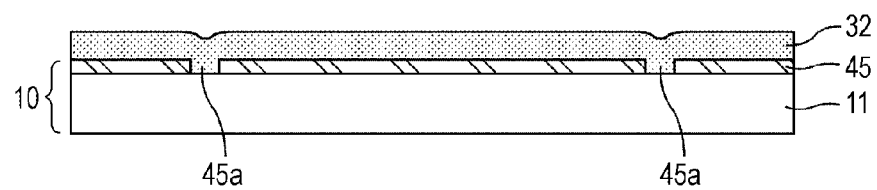

FIG. 16 is a schematic sectional view of the liquid crystal display device, according to the fourth embodiment, illustrated in FIGS. 11 and 12, the liquid crystal display device being subsequent to a step of polymerizing a monomer. In FIG. 16, wiring lines, electrodes, color filters, or the like are not illustrated. In the fourth embodiment, as illustrated in FIG. 16, the electrodes are formed on a pair of transparent base plates 11 and 21. Moreover, polymer layers 32 and 33 are formed over substrates 10 and 20, respectively, including the rivets 52 and the like and form interfaces with liquid crystal layers. Since the polymer layers 32 and 33 used in the fourth embodiment have strong vertical anchoring force, good black display is achieved and display defects such as luminous dots and luminous lines are unlikely to be caused.

Components of the liquid crystal display devices according to the first to fourth embodiments are described below in detail.

In the liquid crystal display devices according to the first to fourth embodiments, the array substrate, the liquid crystal layer, and the counter substrate are stacked in that order from the rear side to viewing side of each liquid crystal display. A polarizer is placed on the rear side of the array substrate. A polarizer is also placed on the viewing side of the counter substrate. The polarizers may be provided with a retardation film. The polarizers may be circular polarizers.

The liquid crystal display devices according to the first to fourth embodiments can use a backlight placed in each liquid crystal display device or outside light as display light. In the case of using the backlight, the backlight is placed on the rear side of the array substrate such that light passes through the array substrate, the liquid crystal layer, and the counter substrate in that order. In the case of using outside light as display light, the array substrate includes a reflector for reflecting outside light. In addition, in at least one region where reflected light is used for display, a polarizer of the counter substrate needs to be circular polarizer equipped with a λ/4 retardation film.

The type of the backlight is not particularly limited and may be an edge light type or a direct type. In a liquid crystal display device including a small-size screen, display can be performed with low power consumption using a small number of light sources and an edge light-type backlight suitable for thinning is widely used.

Examples of a light source that can be used in the first to fourth embodiments include light emitting diodes (LEDs) and cold cathode fluorescent lamps (CCFLs).

Components of the backlight are a reflective sheet, a diffusion sheet, a prism sheet, a light guide plate, and the like in addition to the light source. In an edge light-type backlight, light emitted from a light source enters a light guide plate from a side surface of the light guide plate, is reflected, is diffused, is emitted from a principal surface of the light guide plate in the form of planar light, passes through a prism sheet, and is then emitted as display light. In a direct-type backlight, light emitted from a light source directly passes through a reflecting sheet, a diffusion sheet, a prism sheet, and the like without passing through a light guide plate and is then emitted as display light.

In the liquid crystal display devices according to the first to fourth embodiments, components of the polymer layers, components of monomers contained in the polymer layers, and the like can be analyzed or confirmed in such a way that the polymer layers are taken by decomposing the members and are chemically analyzed by $^{13}$C-nuclear magnetic resonance (NMR), mass spectrometry (MS), and the like.

Example 1

An example in which the liquid crystal display device according to the second embodiment is actually prepared is described below.

First, a pair of substrates including the array substrate and the counter substrate were prepared. The liquid crystal composition containing the liquid crystal material and the monomer for forming the polymer layers was dripped and was then bonded to the other substrate. The color filters were prepared in the counter substrate.

In the counter substrate, linear ribs were pattern-formed on the common electrode by a photolithographic process using a photosensitive acrylic resin. In addition, in the array substrate, the slits were formed in the pixel electrodes in a photolithography step of pattern-forming the pixel electrodes in accordance with the pixels.

In Example 1, the monomer used to form the polymer layers was a compound represented by Chemical Formula (4) below.

[Chem. 8]

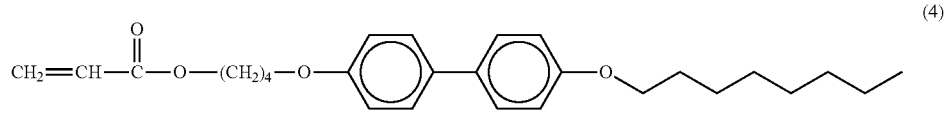

(4)

The compound represented by Chemical Formula (4) contains a biphenyl group and a methacrylate group. An alkoxyl group containing four carbon atoms is bonded to the 4-position of the biphenyl group so as to bridge the biphenyl group and the methacrylate group. Moreover, an alkoxyl group containing eight carbon atoms is bonded to the 4'-position of the biphenyl group. In Example 1, the liquid crystal composition was prepared so as to contain 1% by weight of the monomer represented by Chemical Formula (4). A polymerization initiator, Irgacure 651 (produced by BASF), was added thereto.

Next, a polymerization reaction was carried out in such a way that the liquid crystal layer sandwiched between the substrates was irradiated with ultraviolet light at 0.03 J/cm$^2$ from the array substrate side in a state that a voltage of 0 V was applied thereto, whereby a liquid crystal cell in which the polymer layers were formed on surfaces of the substrates was completed. The time for which the liquid crystal cell was irradiated with ultraviolet light was one minute.

Figure 17:
FIG. 17 is a schematic view illustrating a black screen of a liquid crystal display device manufactured by a polymer layer-forming technique used in Example 1.

A liquid crystal display panel prepared as described above was observed with a polarizing microscope having polarizing axes intersecting at 90° without attaching any polarizer thereto, whereby black display with no luminous dot or luminous line at all was obtained as illustrated in FIG. 17.

Figure 18:
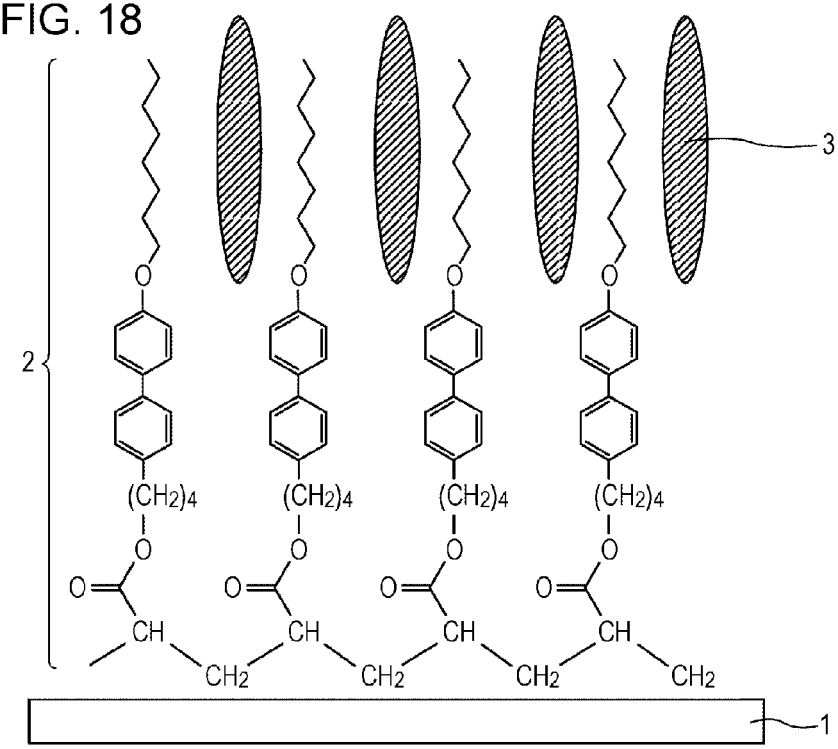
FIG. 18 is a schematic view illustrating the relationship between a side chain of a polymer layer and the alignment of liquid crystal molecules and illustrates the structure of a polymer layer formed using a monomer containing a functional group bonded to a 4-position and an alkoxyl chain bonded to a 4'-position.
Figure 19:
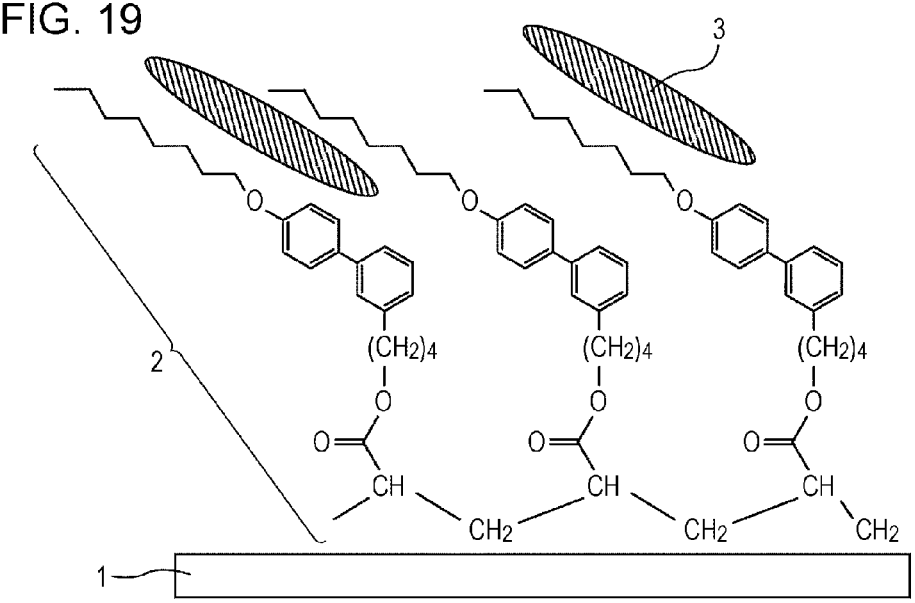
FIG. 19 is a schematic view illustrating the relationship between a side chain of a polymer layer and the alignment of liquid crystal molecules and illustrates the structure of a polymer layer formed using a monomer containing a functional group bonded to a 3-position and an alkoxyl chain bonded to a 4'-position.

FIGS. 18 and 19 are schematic views illustrating the relationship between a side chain of a polymer layer and the alignment of liquid crystal molecules. FIG. 18 illustrates the structure of a polymer layer formed using a monomer containing a functional group bonded to a 4-position and an alkoxyl chain bonded to a 4'-position. FIG. 19 illustrates the structure of a polymer layer formed using a monomer containing a functional group bonded to a 3-position and an alkoxyl chain bonded to a 4'-position.

In the case of forming a polymer layer on a substrate 1 using a monomer containing a functional group and an alkyl group or alkoxyl group bonded to the 4-4' position of a biphenyl group, an alkyl chain or alkoxyl chain contained in a side chain 2 of a polymer extends perpendicularly to a surface of the substrate 1 as illustrated in FIG. 18. Functional groups are bonded to each other to form a main chain of the polymer on a surface of the substrate 1 and therefore the functional groups and the biphenyl group are in a perpendicular relation. As a result, the major axis of each liquid crystal molecule 3 extends in the same direction as the longitudinal direction of the alkyl chain or the alkoxyl chain. Therefore, even though no alignment film is formed or a voltage higher than a threshold value is not applied to a liquid crystal layer, the vertical alignment of the liquid crystal molecules 3 is accomplished by the action of the polymer layer.

On the other hand, in the case of forming a polymer layer on a substrate 1 using, for example, a monomer containing a functional group and an alkyl group or alkoxyl group bonded to the 3-4' position of a biphenyl group, an alkyl chain or alkoxyl chain contained in a side chain 2 of a polymer does not extend perpendicularly to a surface of the substrate 1 as illustrated in FIG. 19, resulting in that the major axis of each liquid crystal molecule 3 is tilted to a surface of the substrate 1 along the longitudinal direction of the alkyl chain or the alkoxyl chain. As a result, the vertical alignment of the liquid crystal molecules 3 is not accomplished.

Reference Example 1

A liquid crystal cell of Reference Example 1 was prepared in substantially the same way as that described in Example 1 except that a material for forming a polymer layer was differed. Incidentally, the dose of irradiation was 0.2 J/cm$^2$. In Reference Example 1, a compound represented by Chemical Formula (5) below was used.

[Chem. 9]

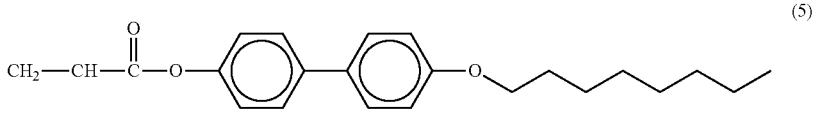

(5)

The compound represented by Chemical Formula (5) has a structure in which a methacrylate group is directly bonded to the 4-position of a biphenyl group and an alkoxyl group containing eight carbon atoms is directly bonded to the 4'-position of the biphenyl group. However, the use of this monomer causes a reduction in voltage holding ratio as compared to the use of the compound represented by Chemical Formula (4) as a monomer.

Described below are results obtained by measuring the liquid crystal cell completed in each of Example 1 and Reference Example 1 for voltage holding ratio (VHR). The VHR was determined in such a way that after a pulse voltage of 1 V was applied thereto, charge retention was confirmed for 16.61 ms.

As a result of performing measurement in Example 1 and Reference Example 1, Example 1 was 96.2%, whereas Reference Example was 75.5%. As described above, in the liquid crystal cell of Example 1, high voltage holding ratio is achieved.

Fifth Embodiment

A liquid crystal display device according to a fifth embodiment is substantially the same as the first embodiment except that a color filter-on-array (COA) mode in which color filters are not formed on a counter substrate but are formed on an array substrate is used.

Figure 20:
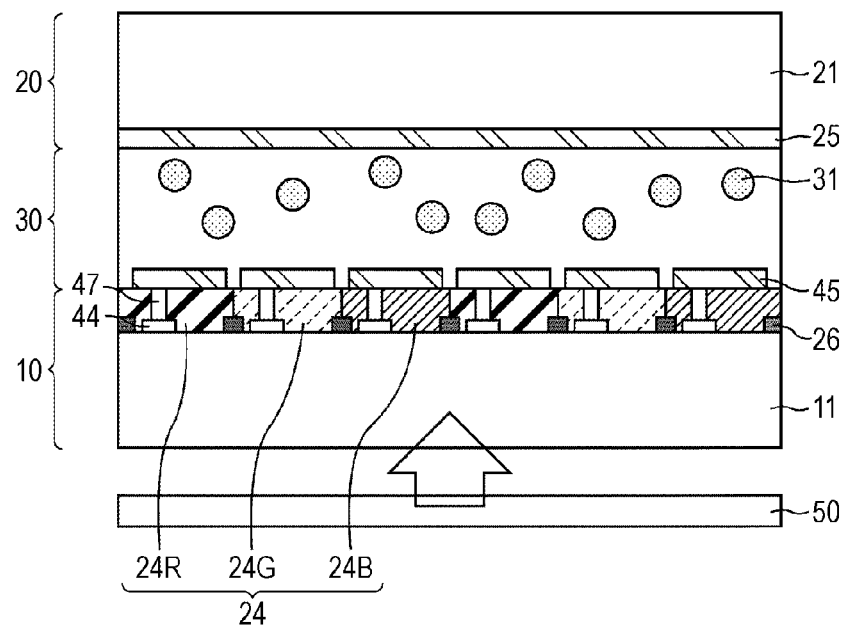
FIG. 20 is a schematic sectional view of a liquid crystal display device, according to a fifth embodiment, prior to a monomer polymerization step.
Figure 21:
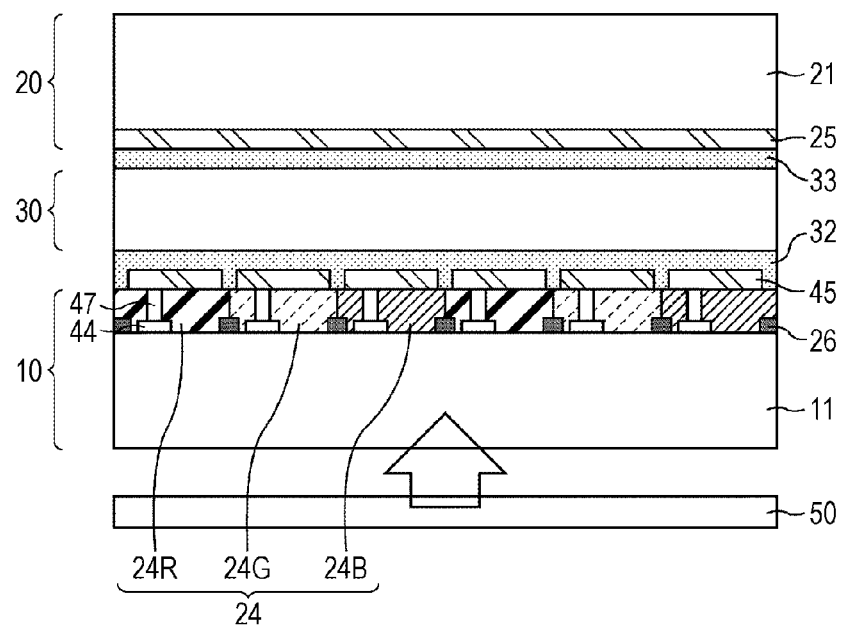
FIG. 21 is a schematic sectional view of the liquid crystal display device, according to the fifth embodiment, subsequent to the monomer polymerization step.
Figure 22:
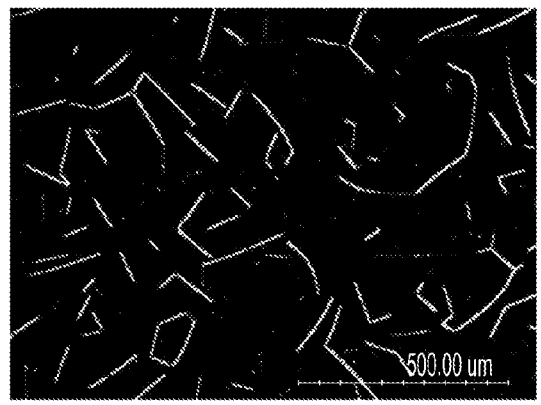
FIG. 22 is a schematic view illustrating a black screen of a liquid crystal display device (first conventional example) formed by a conventional polymer layer-forming technique.
Figure 23:
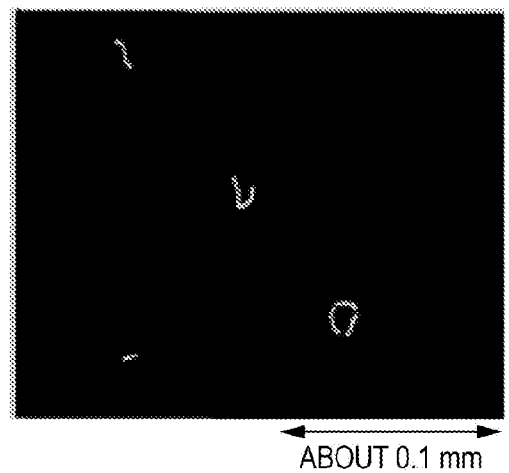
FIG. 23 is a schematic view illustrating a black screen of a liquid crystal display device (second conventional example) formed by a conventional polymer layer-forming technique.
Figure 24:
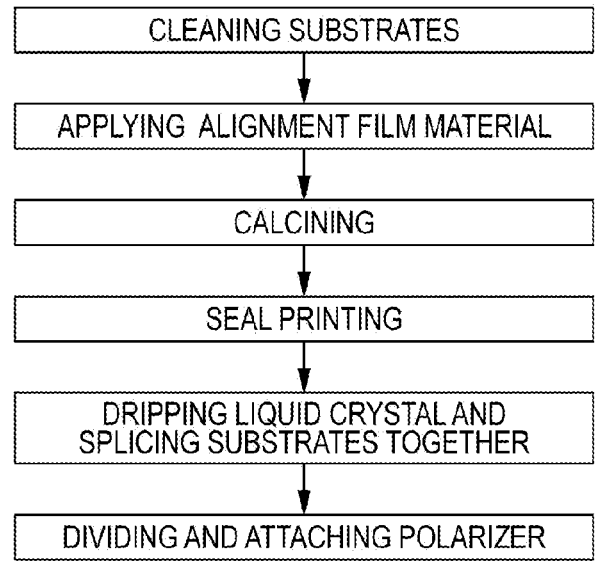
FIG. 24 is a flowchart illustrating an example of a process for manufacturing a common liquid crystal display device.
Figure 25:
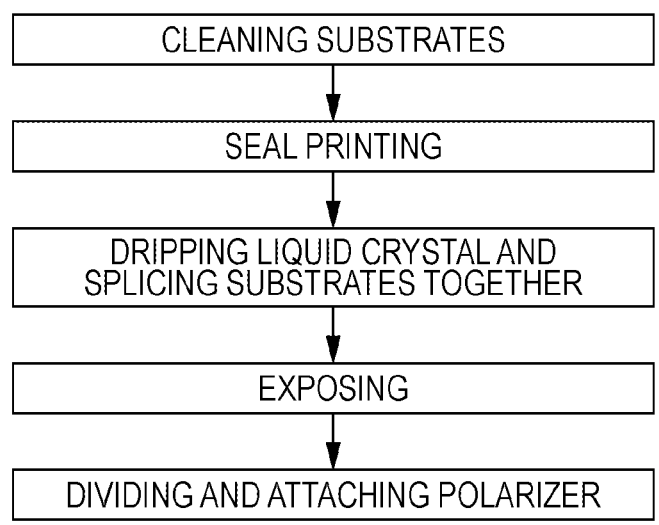
FIG. 25 is a flowchart illustrating an example of a process for manufacturing a liquid crystal display device according to the present invention.

FIGS. 20 and 21 are schematic sectional views of the liquid crystal display device according to the fifth embodiment. FIG. 20 illustrates the liquid crystal display device prior to a monomer polymerization step. FIG. 21 illustrates the liquid crystal display device subsequent to the monomer polymerization step. In the fifth embodiment, as illustrated in FIGS. 20 and 21, color filters 24 and a black matrix 26 are formed on an array substrate 10. In particular, the color filters 24 and the black matrix 26 are arranged between an insulating transparent base plate 11 made of glass or the like and pixel electrodes 45. In addition, TFTs 44 are formed between the transparent base plate 11 and the color filters 24. The pixel electrodes 45 are connected to the 44 through contact portions 47 formed in the color filters 24. In the liquid crystal display device according to the second embodiment, a polymer layer 32 is placed on surfaces of the pixel electrodes 45 and has substantially no alignment film. Moreover, a polymer layer 33 is placed on a surface of a common electrode 25 and has substantially no alignment film. FIGS. 20 and 21 illustrate one using three-color filters of red 24R, green 24G, and blue 24B. However, the kind, number, and arrangement order of colors are not particularly limited as long as at least these three colors are used. Incidentally, the black matrix may be placed on the counter substrate 20 side as required.

In the case of such a color filter-on-array as described in the fifth embodiment unlike the first embodiment, a liquid crystal layer is preferably irradiated with light from the counter substrate side in order to form a polymer layer. This allows the blocking of light by color filters, a black matrix, or the like to be reduced. Therefore, high transmittance is achieved and the rate of polymerization is increased. Furthermore, no shade is available and therefore the possibility of alignment failures can be reduced.

According to the color filter-on-array, a problem with misalignment due to the fact that pixel electrodes and color filters are formed on different substrates is solved.

This application is based on Japanese Patent Application No. 2011-051531 filed on Mar. 9, 2011 and claims priority under the Paris Convention and laws and regulations of destination countries. The entire contents of the application are incorporated herein by reference.

REFERENCE SIGNS LIST

1 Substrate
2 Side chain
3 Liquid crystal molecules
10 Array substrate
11, 21 Transparent base plate (insulating base plate)
32, 33 Polymer layer
14 Insulating film
20 Counter substrate
24 Color filters
24R Red (R) color filters
24G Green (G) color filters
24B Blue (B) color filters
25 Common electrode
25a Slits in common electrode
25b Holes in common electrode
26 Black matrix
30 Liquid crystal layer
31 Monomer
41 Gate signal lines
42 Source signal lines
43 Auxiliary capacitor (CS) wiring lines
44 TFTs
45 Pixel electrodes
45a Slits in pixel electrodes
47 Contact portions
50 Backlight
51 Ribs (dielectric protrusions)
52 Rivets (dielectric protrusions)

The invention claimed is:

1. A liquid crystal display device comprising:
a pair of substrates having substantially no alignment film;
a liquid crystal layer which is sandwiched between the substrates and which contains a liquid crystal material; and
a polymer layer which is formed only on a surface of at least one of the substrates and which controls the alignment of molecules of a liquid crystal to align the molecules in a direction perpendicular to the substrate,
wherein the polymer layer is one formed by polymerizing at least one monomer contained in the liquid crystal layer and the monomer contains a compound represented by the following Chemical Formula (1):

[Chem. 1]

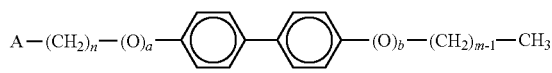

(1)

$$A-(CH_2)_n-(O)_a-\phantom{XX}-(O)_b-(CH_2)_{m-1}-CH_3$$

(where A represents an acrylate group, a methacrylate group, an ethacrylate group, a vinyl group, or an allyl group; a is 0 or 1; b is 0 or 1; m is a natural number of 4 to 12; and n is an integer of 2 to 4).

2. The liquid crystal display device according to claim 1, wherein the monomer contains a bifunctional monomer and the molar ratio of the bifunctional monomer to the compound represented by Chemical Formula (1) is 0.1 or less.

3. The liquid crystal display device according to claim 1, wherein the liquid crystal composition contains a polymerization initiator.

4. The liquid crystal display device according to claim 1, wherein the substrates each include an electrode, one of the substrates has a wall-shaped dielectric protrusion located on the liquid crystal layer side of the electrode, and the electrode included in the other substrate has a slit.

5. The liquid crystal display device according to claim 1, wherein the substrates each include an electrode and the electrode has a slit.

6. The liquid crystal display device according to claim 1, wherein the substrates each include an electrode and one of the substrates has a columnar dielectric protrusion located on the liquid crystal layer side of the electrode.

* * * * *